(12) United States Patent
Raymundo Silva et al.

(10) Patent No.: US 12,744,402 B2
(45) Date of Patent: Sep. 22, 2026

(54) REGULATION HANDOVER OF MULTIPLE LOOPS IN A CONTROL SYSTEM

(71) Applicant: Cirrus Logic International Semiconductor Ltd., Edinburgh (GB)

(72) Inventors: Paulo Gustavo Raymundo Silva, Austin, TX (US); Jason W. Lawrence, Austin, TX (US); Mucahit Kozak, Austin, TX (US); Graeme G. Mackay, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 740 days.

(21) Appl. No.: 18/338,090

(22) Filed: Jun. 20, 2023

(65) Prior Publication Data

US 2024/0429729 A1 Dec. 26, 2024

(51) Int. Cl.
*H02J 7/90* (2026.01)

(52) U.S. Cl.
CPC ........... *H02J 7/933* (2026.01); *H02J 2207/20* (2020.01)

(58) Field of Classification Search
CPC .. H02J 7/933; H02J 2207/20; H02J 7/007182; G05F 1/46
See application file for complete search history.

(56) References Cited

U.S. PATENT DOCUMENTS

| | | | | |
|---|---|---|---|---|
| 9,461,536 | B2 * | 10/2016 | Bizjak | H02J 7/977 |
| 10,131,245 | B2 * | 11/2018 | Hand, III | B60L 58/15 |
| 11,048,321 | B2 * | 6/2021 | Saxena | G06F 1/3287 |
| 11,865,945 | B2 * | 1/2024 | Kamel | B60L 58/22 |
| 2018/0076641 | A1 * | 3/2018 | Houston | H02M 3/158 |
| 2019/0207392 | A1 * | 7/2019 | Luo | H02J 7/92 |

* cited by examiner

*Primary Examiner* — Adolf D Berhane
(74) *Attorney, Agent, or Firm* — Jackson Walker L.L.P.

(57) ABSTRACT

A controller for generating a control parameter of a feedback system may include a proportional path comprising a first selector configured to select one of a plurality of proportional signals to generate a proportional path output, wherein each of the proportional signals is based on a respective one of a plurality of error signals, each of the plurality of error signals associated with a respective regulated physical quantity, an integral path comprising a second selector configured to select one of a plurality of integral signals as a second selector output, wherein each of the integral signals is based on a respective one of the plurality of error signals and a single integrator configured to accumulate successive samples of the second selector output to generate an integral path output, and combiner logic configured to combine the proportional path output and the integral path output to generate the control parameter.

24 Claims, 7 Drawing Sheets

REGULATION HANDOVER OF MULTIPLE LOOPS IN A CONTROL SYSTEM

FIELD OF DISCLOSURE

The present disclosure relates in general to circuits for electronic devices, including without limitation personal devices such as wireless telephones and media players, and more specifically, to a multi-feedback loop control system for controlling charging of a battery of an electronic device.

BACKGROUND

Portable electronic devices, including wireless telephones, such as mobile/cellular telephones, tablets, cordless telephones, mp3 players, smart watches, health monitors, and other consumer devices, are in widespread use. Such a portable electronic device may include a battery (e.g., a lithium-ion battery) for powering components of the portable electronic device. Typically, such batteries used in portable electronic devices are rechargeable, such that when charging, the battery converts electrical energy into chemical energy which may later be converted back into electrical energy for powering components of the portable electronic device.

Control systems for charging a battery often operate with multiple feedback control loops in order to regulate multiple physical quantities (e.g., various voltages and/or currents) within particular boundaries. In traditional approaches, a control system may implement a proportional-integral (PI) controller with multiple independent control paths for the various multiple physical quantities being regulated, and a minimum selector may select a minimum control value from the multiple control paths as a control variable for a plant (e.g., a power converter of a battery charger) of a control system. Disadvantages of such an approach are that each of the individual control paths may have its own state and process its own error signal, which may lead to overshoots. Further, the various integral paths may slow loop transitions. Accordingly, improved control systems for regulation of multiple physical quantities may be desired.

SUMMARY

In accordance with the teachings of the present disclosure, one or more disadvantages and problems associated with existing approaches to control and regulation of multiple physical quantities may be reduced or eliminated.

In accordance with embodiments of the present disclosure, a controller for generating a control parameter of a feedback system may include a plurality of control loops, wherein each control loop of the plurality of control loops is configured to regulate a respective physical quantity and wherein each control loop of the plurality of control loops comprises a proportional path configured to apply a proportional gain to an error signal associated with its respective physical quantity in order to generate a proportional path output, an integral path comprising an integrator configured to apply an integral gain to the error signal associated with its respective physical quantity and configured to cross couple control loop outputs from the other of the plurality of control loops and to select a value for accumulating an integral path output and combiner logic configured to combine the proportional path output and the integral path output to generate a respective control loop output for the control loop. The controller may also include selection logic configured to select one from the control loop outputs of the plurality of control loops as the control parameter.

In accordance with these and other embodiments of the present disclosure, a controller for generating a control parameter of a feedback system may include a proportional path comprising a first selector configured to select one of a plurality of proportional signals to generate a proportional path output, wherein each of the proportional signals is based on a respective one of a plurality of error signals, each of the plurality of error signals associated with a respective regulated physical quantity, an integral path comprising a second selector configured to select one of a plurality of integral signals as a second selector output, wherein each of the integral signals is based on a respective one of the plurality of error signals and a single integrator configured to accumulate successive samples of the second selector output to generate an integral path output, and combiner logic configured to combine the proportional path output and the integral path output to generate the control parameter.

In accordance with these and other embodiments of the present disclosure, a method for generating a control parameter of a feedback system may include regulating, with each control loop of a plurality of control loops, a respective physical quantity, wherein each control loop of the plurality of control loops comprises a proportional path configured to apply a proportional gain to an error signal associated with its respective physical quantity in order to generate a proportional path output, an integral path comprising an integrator configured to apply an integral gain to the error signal associated with its respective physical quantity and configured to cross couple control loop outputs from the other of the plurality of control loops and to select a value for accumulating an integral path output, and combiner logic configured to combine the proportional path output and the integral path output to generate a respective control loop output for the control loop. The method may also include selecting one from the control loop outputs of the plurality of control loops as the control parameter.

In accordance with these and other embodiments of the present disclosure, a method for generating a control parameter of a feedback system may include selecting, with a first selector of a proportional path of the feedback system one of a plurality of proportional signals to generate a proportional path output, wherein each of the proportional signals is based on a respective one of a plurality of error signals, each of the plurality of error signals associated with a respective regulated physical quantity. The method may also include selecting, with a second selector of an integral path of the feedback system, one of a plurality of integral signals as a second selector output, wherein each of the integral signals is based on a respective one of the plurality of error signals. The method may further include accumulating, with a single integrator of the integral path, successive samples of the second selector output to generate an integral path output. Additionally, the method may include combining the proportional path output and the integral path output to generate the control parameter.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
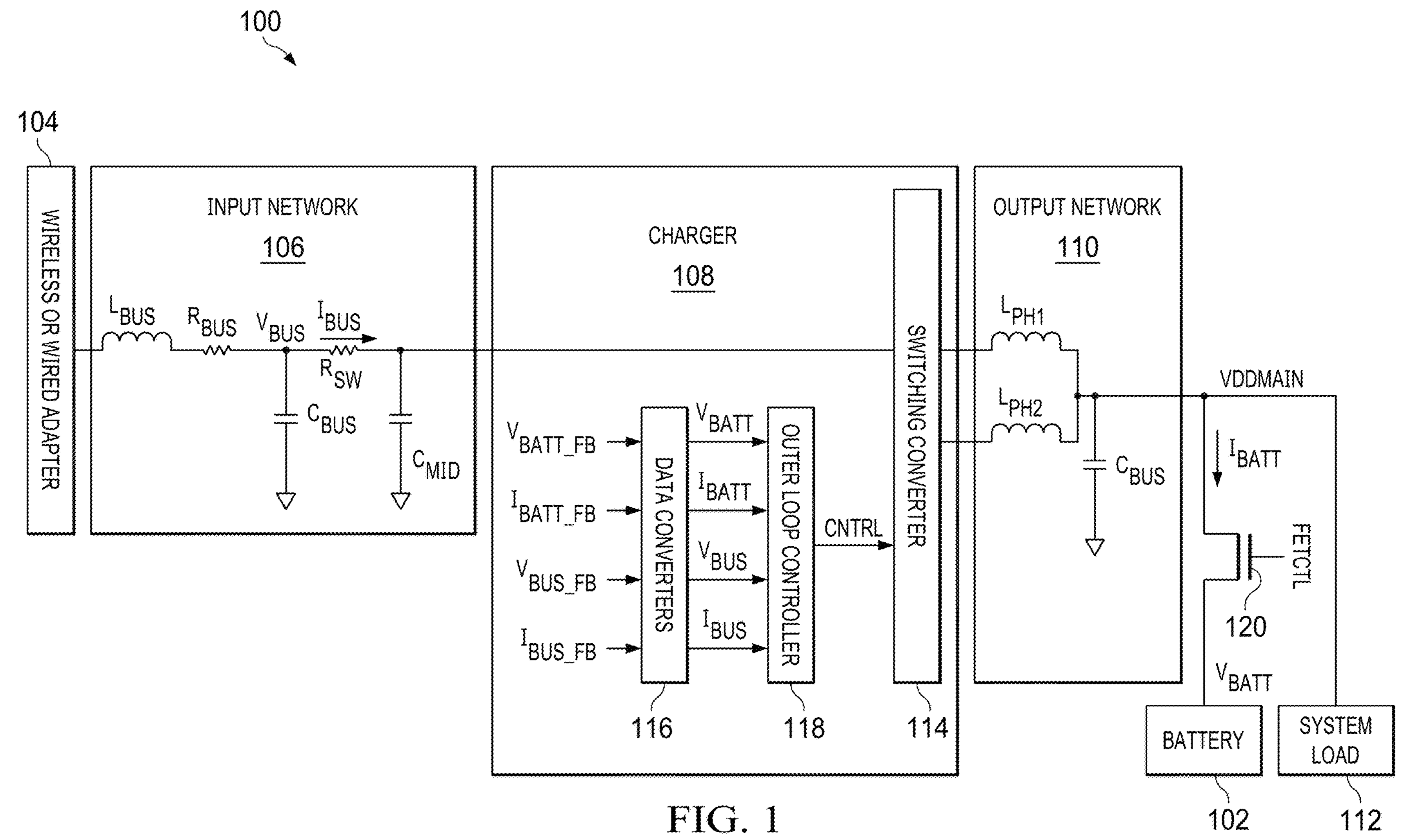
FIG. 1 illustrates an example block diagram of selected components of a system for charging a battery of an electronic device, in accordance with embodiments of the present disclosure.

FIG. 1 illustrates an example block diagram of selected components of a system 100 for charging a battery 102 of a battery-powered device, in accordance with embodiments of the present disclosure. A battery-powered device may comprise any suitable electronic device, including without limitation a mobile phone, smart phone, tablet, laptop/notebook computer, media player, handheld, smart watch, gaming controller, etc.

As shown in FIG. 1, an energy source, such as wireless or wired electric adapter 104 may be coupled to a charger 108 via an input network 106. Charger 108 may in turn be coupled to battery 102 and a system load 112 of the battery-powered device via an output network 110.

Battery 102 may include any system, device, or apparatus configured to convert chemical energy stored within battery 102 to electrical energy. For example, in some embodiments, battery 102 may be integral to a battery-powered device, and battery 102 may be configured to deliver electrical energy to system load 112 and other components of the battery-operated device. Further, battery 102 may also be configured to recharge, in which it may convert electrical energy received by battery 102 from charger 108 into chemical energy to be stored for later conversion back into electrical energy. As an example, in some embodiments, battery 102 may comprise a lithium-ion battery. Battery 102 may comprise a single cell, multiple cells in series, multiple cells in parallel, or a combination of multiple series and parallel cells.

Wireless or wired electric adapter 104 may include any suitable adapter configured to deliver electrical energy to charger 108 via input network 106. For example, in some embodiments, adapter 104 may comprise a Universal Serial Bus (USB) Type C/Power Delivery (USB-C/PD) wall charger with a programmable voltage between 5 volts and 20 volts. In yet other embodiments, adapter 104 may comprise an external wireless charger configured to deliver electrical energy to input network 106 via wireless transmissions. In these and other embodiments, adapter 104 may comprise a Qi-compliant wireless charger.

Input network 106 may comprise any suitable electrical network of passive circuit elements (e.g., resistors, capacitors, and/or inductors) that may filter or condition the electrical energy delivered from adapter 104. In some embodiments, a portion of input network 106 may comprise a cable and/or other conductor for electrically coupling adapter 104 to charger 108. As shown in FIG. 1, a bus voltage $V_{BUS}$ may be present on an electrical node within input network 106 and a bus current $I_{BUS}$ may flow within input network 106. As described in greater detail below, bus voltage $V_{BUS}$ and bus current $I_{BUS}$ may be among the physical quantities regulated within system 100 when charging battery 102.

Charger 108 may comprise any suitable system, device, or apparatus configured to receive energy from adapter 104 via input network 106 and transfer such energy to battery 102 to charge battery 102. As shown in FIG. 1, charger 108 may be implemented in part by a switching converter 114, which may comprise a buck converter, a boost converter, or other power converter. Further as depicted in FIG. 1, charger 108 may include data converters 116 (e.g., analog-to-digital converters) configured to convert: a measured analog feedback bus voltage $V_{BUS\_FB}$ into an equivalent digital signal for bus voltage $V_{BUS}$, a measured analog feedback bus current $I_{BUS\_FB}$ into an equivalent digital signal for bus current $I_{BUS}$, a measured analog feedback battery voltage $V_{BATT\_FB}$ into an equivalent digital signal for a battery voltage $V_{BATT}$, and a measured analog feedback battery current $I_{BATT\_FB}$ into an equivalent digital signal for a battery voltage $I_{BATT}$. Based on these digital equivalent signals for bus voltage $V_{BUS}$, bus current $I_{BUS}$, battery voltage $V_{BATT}$, and battery voltage $I_{BATT}$, an outer loop controller 118 may generate a control parameter CNTRL that may control the switching of switches integral to switching converter 114. For example, in some embodiments, control parameter CNTRL may be indicative of a desired duty cycle for one or more switches integral to switching converter 114.

Output network 110 may comprise any suitable electrical network of passive circuit elements (e.g., resistors, capacitors, and/or inductors) that may filter or condition the electrical energy delivered from charger 104, in order to generate a battery current $I_{BATT}$ driven to battery 102 to charge battery 102. As further shown in FIG. 1, a battery voltage $V_{BATT}$ may exist across terminals of battery 102. In FIG. 1, for the purposes of clarity and exposition, output network 110 is depicted as having two power inductors ($L_{PH1}$, $L_{PH2}$), one for each phase of a two-phase switching converter 114. However, it is understood that output network 110 may comprise any suitable number of power inductors and switching converter 114 may operate with any suitable number of phases.

System load 112 may comprise a plurality of electrical and electronic components configured to carry out the functionality of the battery-powered device, including without limitation microphones, speakers, radio antennas, processors, haptic actuators, display devices, lights, motors, etc. System load 112 may be powered directly from battery 102 and/or charger 108.

A control switch 120 may be coupled between battery 102 and the output of output network 110 which may have a voltage of VDDMAIN that supplies electrical energy to system load 112. An impedance of control switch 120 may be regulated by a control signal FETCTL, in order to implement a charging profile for battery 102.

Figure 2:
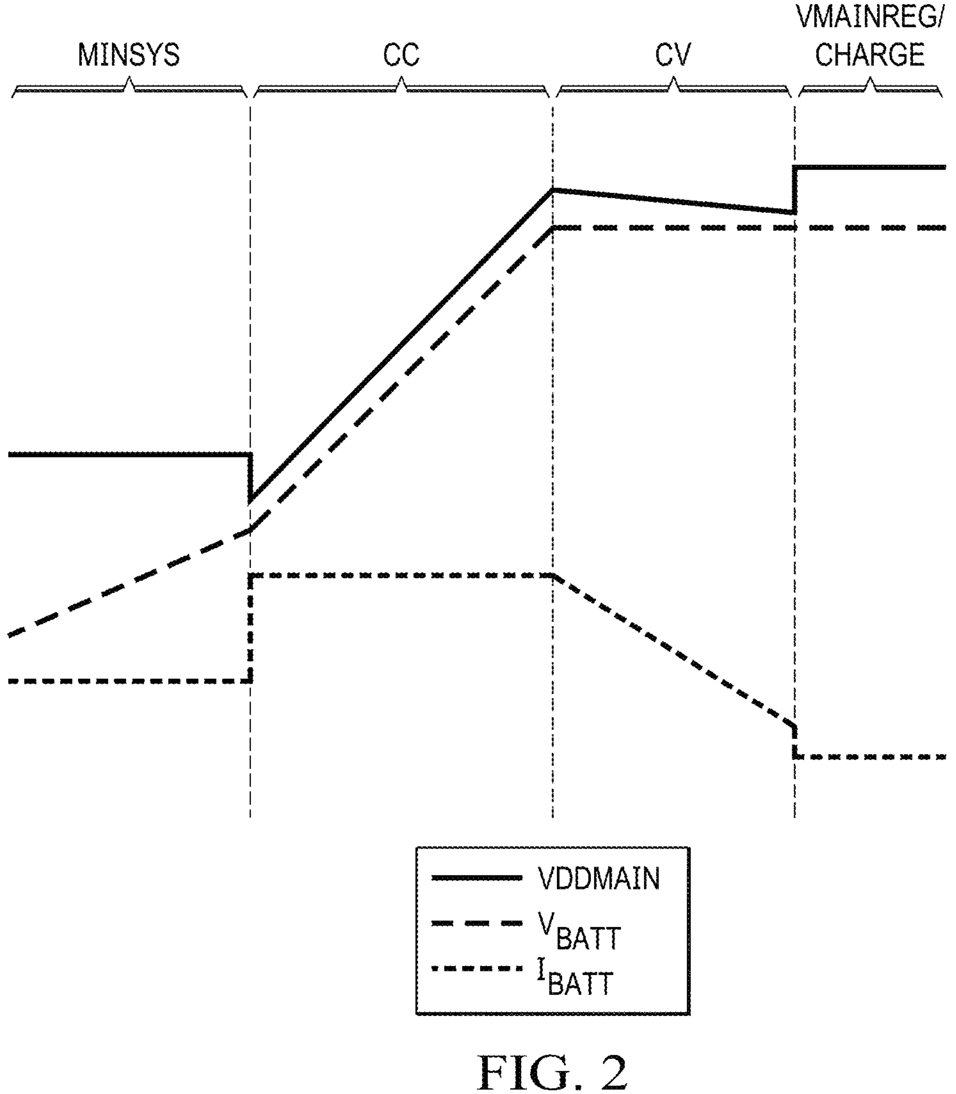
FIG. 2 illustrates an example of a charging profile of a battery of a battery-powered device, in accordance with embodiments of the present disclosure.

FIG. 2 illustrates an example of a charging profile of battery 102, in accordance with embodiments of the present disclosure. The example charging profile of FIG. 2 depicts four charging modes of charger 108 for charging of battery 102. In a minimum system (MINSYS) mode, impedance of control switch 120 may be controlled to regulate battery current $I_{BATT}$, and battery voltage $V_{BATT}$ may increase while main voltage VDDMAIN may remain constant. In a constant current (CC) mode, charger 108 may regulate battery current $I_{BATT}$ at a constant reference current $I_{BATT\_REF}$. In a constant voltage (CV) mode, control switch 120 may be fully turned on (e.g., closed) and a final voltage for battery voltage $V_{BATT}$ may be reached and thus charger 108 may regulate battery voltage $V_{BATT}$ at a constant reference current $V_{BATT\_REF}$. In a VMAINREG/CHARGE COMPLETE mode, control switch 120 may be fully turned off (e.g., opened) and with battery 102 fully charged, main voltage VDDMAIN may be regulated by charger 108 to a predetermined amount (e.g., 1%) above battery voltage $V_{BATT}$.

Thus, as shown by FIG. 2, charger 108 may implement two control loops for charging: one for regulating battery voltage $V_{BATT}$ and one for regulating battery current $I_{BAT}$. In addition, charger 108 may implement two control loops for protection of system 100, a limitation of a maximum current $I_{BUS}$ MAX for bus current $I_{BUS}$ and a limitation of a minimum voltage $V_{BUS\_MIN}$ for bus voltage $V_{BUS}$.

Figure 3:
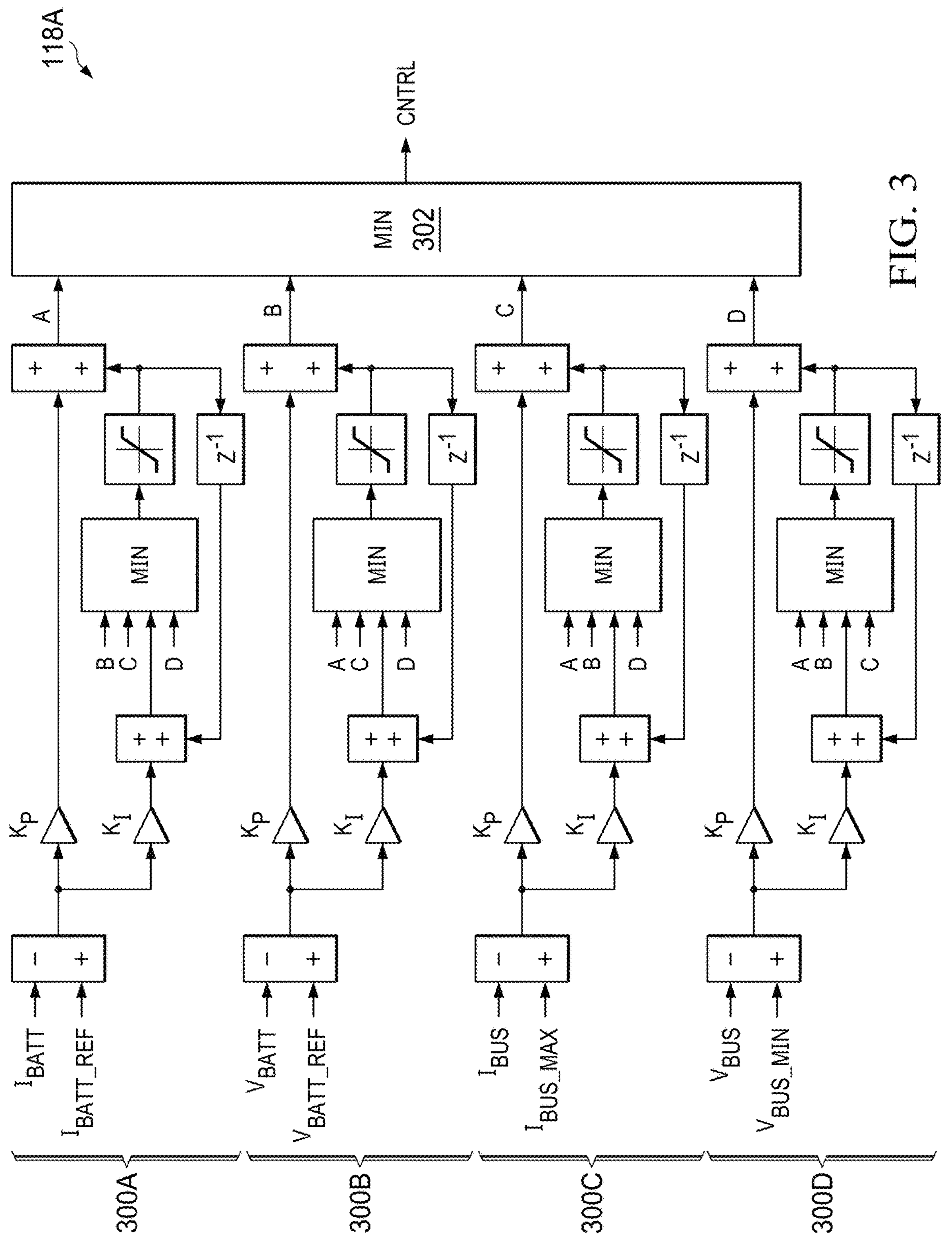
FIG. 3 illustrates an example block diagram of selected components of an outer loop controller for controlling a control parameter using cross-coupled control loops, in accordance with embodiments of the present disclosure.

FIG. 3 illustrates an example block diagram of selected components of an outer loop controller 118A for controlling control parameter CNTRL, in accordance with embodiments of the present disclosure. In some embodiments, outer loop controller 118A may be used to implement all or a portion of outer loop controller 118 shown in FIG. 1. As shown in FIG. 3, outer loop controller 118A may include a control loop 300A for regulating battery current $I_{BATT}$, a control loop 300B for regulating battery voltage $V_{BATT}$, a control loop 300C for regulating bus current $I_{BUS}$, and a control loop 300D for regulating bus voltage $V_{BUS}$. Thus, control loop 300A may generate an intermediate control parameter A based on an error between battery current $I_{BATT}$ and reference current $I_{BATT\_REF}$, control loop 300B may generate an intermediate control parameter B based on an error between battery voltage $V_{BATT}$ and reference voltage $V_{BATT\_REF}$, control loop 300C may generate an intermediate control parameter C based on an error between bus current $I_{BUS}$ and maximum current $I_{BUS}$ MAX, and control loop 300D may generate an intermediate control parameter D based on an error between bus voltage $V_{BUS}$ and minimum voltage $V_{BUS\_MIN}$. A minimum selector 302 may select the minimum of intermediate control parameters A, B, C, and D to output as control parameter CNTRL.

Each control loop 300 may include a proportional path that applies a respective proportional gain $K_P$ to the respective error signal for the control loop 300 and an integral path that applies a respective integral gain $K_I$ to the respective error signal for the control loop 300 and generates an integral sum equal to the gained error plus a delayed version of the output of the integral path, wherein the output of the integral path is a minimum selected from a previous sample of the integral sum for the control loop 300 and previous samples of the intermediate control parameters of the other control loops 300. In other words, for example, the integral path of control loop 300A may generate an integral sum equal to its respective gained error with a delayed version of the output of its respective integral path, wherein the output of the integral path is a minimum selected from the previous integral sum of the gained error for the control loop 300 and the intermediate control parameters B. C, and D of the other control loops 300B, 300C, and 300D, respectively. Thus, outer loop controller 118A cross-couples the various control loops 300 such that individual proportional-integral states of the control loops 300 track each other in steady state operation.

Figure 4:
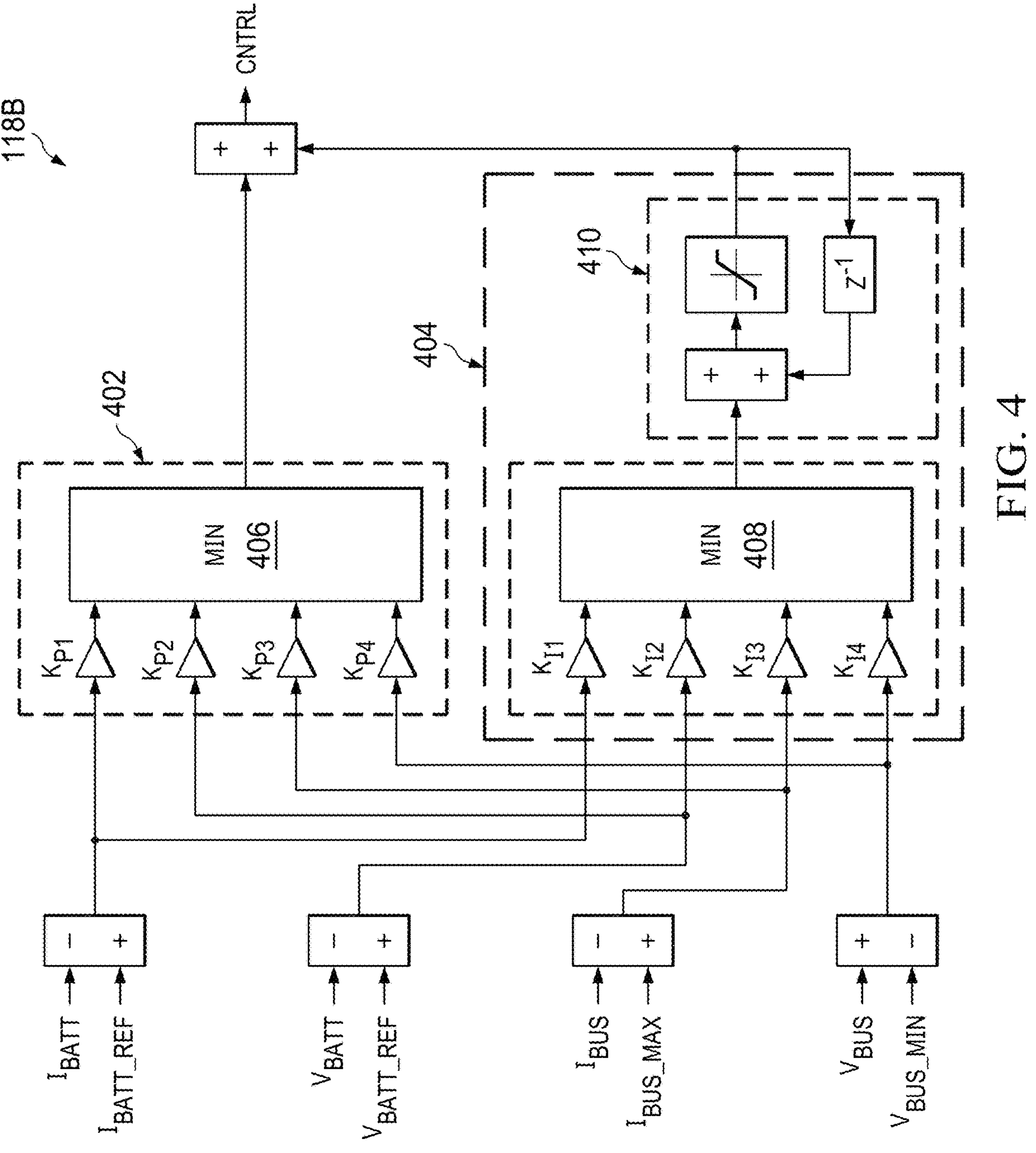
FIG. 4 illustrates an example block diagram of selected components of an outer loop controller for controlling a control parameter using a single integrator, in accordance with embodiments of the present disclosure.

FIG. 4 illustrates an example block diagram of selected components of an outer loop controller 118B for controlling control parameter CNTRL, in accordance with embodiments of the present disclosure. In some embodiments, outer loop controller 118B may be used to implement all or a portion of outer loop controller 118 shown in FIG. 1. As shown in FIG. 4, outer loop controller 118B may include a proportional path 402 and an integral path 404. Proportional path 402 may apply proportional gains $K_{P1}$, $K_{P2}$, $K_{P3}$, and $K_{P4}$, to the error signal for battery current $I_{BATT}$ (e.g., $I_{BATT\_REF}-I_{BATT}$), the error signal for battery voltage $V_{BATT}$ (e.g., $V_{BATT\_REF}-V_{BATT}$), the error signal for bus current $I_{BUS}$ (e.g., $I_{BUS}$ MAX$-I_{BUS}$), and the error signal for bus voltage $V_{BUS}$ (e.g., $V_{BUS}-V_{BUS\_MIN}$), respectively. Proportional path 402 may also select a minimum of these gained error signals, with minimum selector 406, as the output of proportional path 402.

Similarly, integral path 404 may apply proportional gains $K_{I1}$, $K_{I2}$, $K_{I3}$, and $K_{I4}$, to the error signal for battery current $I_{BATT}$ (e.g., $I_{BATT\_REF}-I_{BATT}$), the error signal for battery voltage $V_{BATT}$ (e.g., $V_{BATT\_REF}-V_{BATT}$), the error signal for bus current $I_{BUS}$ (e.g., $I_{BUS\_MAX}-I_{BUS}$), and the error signal for bus voltage $V_{BUS}$ (e.g., $V_{BUS}-V_{BUS\_MIN}$), respectively. Integral path 404 may also select a minimum of these gained error signals with minimum selector 408, and may integrate the output of minimum selector 408 with a single integrator 410 to generate the output of integral path 404. Outer loop controller 118B may output a sum of the output of proportional path 402 and the output of integral path 404 as the control parameter CNTRL.

Thus, in outer loop controller 118B, a single integrator 410 is shared by all of the control loops, with a separate loop selection for proportional path 402 and integral path 404, which enable fast loop transitions for both of proportional path 402 and integral path 404. One potential disadvantage of outer loop controller 118B is that it may simultaneously select two different error signals. Such disadvantage may be overcome by outer loop controller 118C described below.

Figure 5:
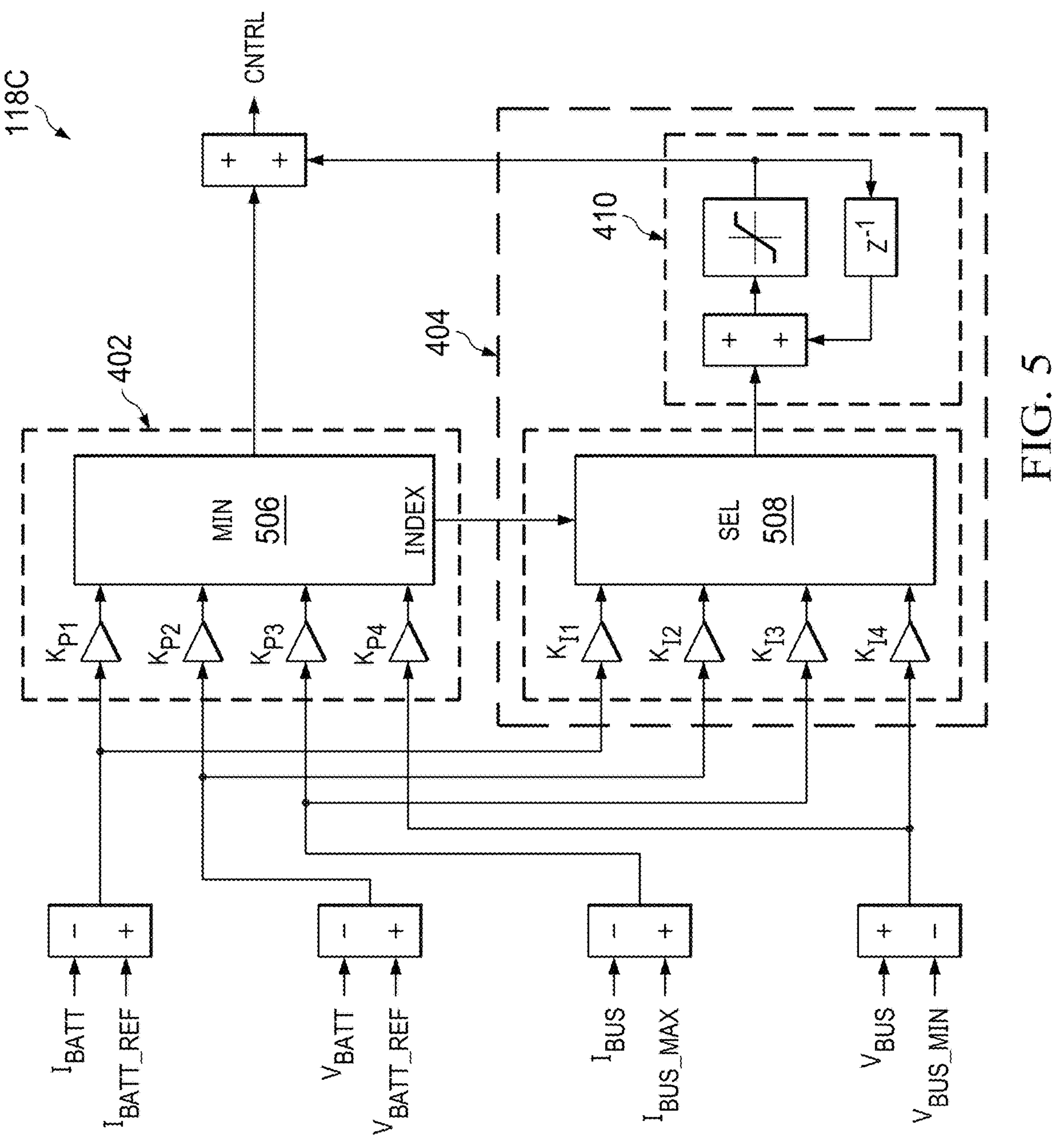
FIG. 5 illustrates an example block diagram of selected components of an outer loop controller for controlling a control parameter using a single integrator and a single minimum selector, in accordance with embodiments of the present disclosure.

FIG. 5 illustrates an example block diagram of selected components of an outer loop controller 118C for controlling control parameter CNTRL, in accordance with embodiments of the present disclosure. In some embodiments, outer loop controller 118C may be used to implement all or a portion of outer loop controller 118 shown in FIG. 1. Outer loop controller 118C of FIG. 5 may be similar in many respects to outer loop controller 118B of FIG. 4, and thus only certain differences between outer loop controller 118C and outer loop controller 118B may be described below.

In particular, outer loop controller 118C may include an index-generating minimum selector 506 in lieu of minimum selector 406 of outer loop controller 118B and may include an indexed selector 508 in lieu of minimum selector 408 of outer loop controller 118C. Index-generating minimum selector 506 may be similar in many respects to minimum selector 406, except that in addition to selecting a minimum of the gained error signals for proportional path 402, index-generating minimum selector 506 may also generate an index signal indicative of which gained error signal was selected by index-generating minimum selector 506. Indexed selector 508 may receive the index signal and, rather than selecting a minimum of the gained error signals of integral path 404, may select the gained error signal corresponding to the selected gained error signal of proportional path 402. For example, if the gained error signal corresponding to battery current $I_{BATT}$ is selected by index-generating minimum selector 506, then the gained error signal corresponding to battery current $I_{BATT}$ may be selected by indexed selector 508.

Thus, in outer loop controller 118C, a single integrator 410 is shared by all of the control loops, with a single selector in proportional path 402 that determines selection for both proportional path 402 and integral path 404, enabling fast loop transitions controlled exclusively by proportional path 402.

Figure 6:
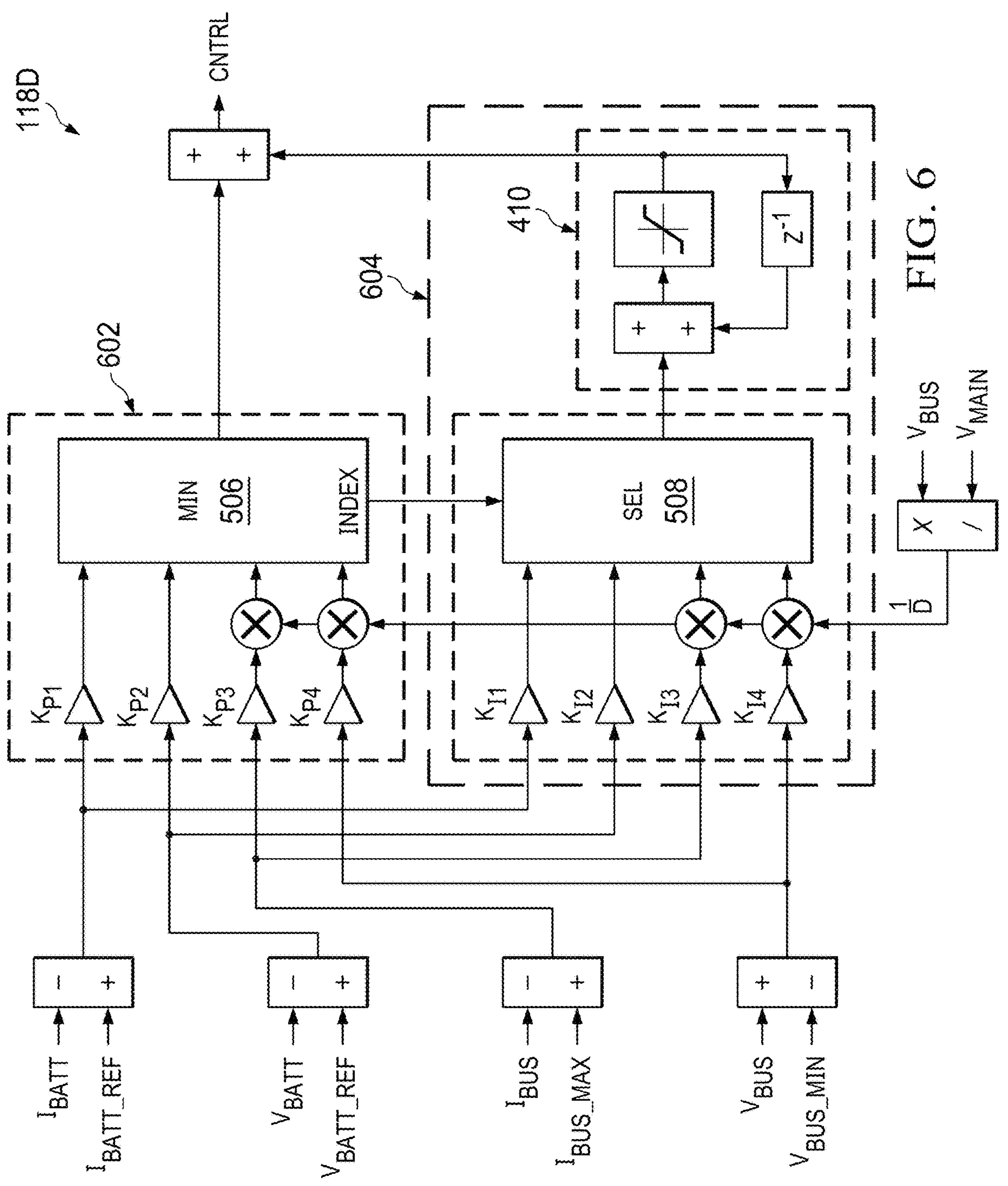
FIG. 6 illustrates an example block diagram of selected components of an outer loop controller for controlling a control parameter using a single integrator, a single minimum selector, and duty cycle compensation, in accordance with embodiments of the present disclosure.

FIG. 6 illustrates an example block diagram of selected components of an outer loop controller 118D for controlling control parameter CNTRL, in accordance with embodiments of the present disclosure. In some embodiments, outer loop controller 118D may be used to implement all or a portion of outer loop controller 118 shown in FIG. 1. Outer loop controller 118D of FIG. 6 may be similar in many respects to outer loop controller 118C of FIG. 5, and thus only certain differences between outer loop controller 118D and outer loop controller 118C may be described below.

In particular, outer loop controller 118D may include proportional path 602 in lieu of proportional path 402 of outer loop controller 118C and may include integral path 604 in lieu of integral path 404 of outer loop controller 118C. Proportional path 602 of outer loop controller 118D may be similar in many respects to proportional path 402 of outer loop controller 118C, except that proportional path 602 may apply a compensation gain 1/D to the individual proportional gains $K_{P3}$ and $K_{P4}$ for the error signals of bus current $I_{BUS}$ and bus voltage $V_{BUS}$, respectively, wherein D is a duty cycle of switching converter 114 and $1/D=V_{BUS}/V_{BATT}$. Similarly, integral path 604 of outer loop controller 118D may be similar in many respects to integral path 404 of outer loop controller 118C, except that integral path 604 may apply compensation gain 1/D to the individual proportional gains $K_{I3}$ and $K_{I4}$ for the error signals of bus current $I_{BUS}$ and bus voltage $V_{BUS}$, respectively. Such scaling of the error signals for the control loops for bus current $I_{BUS}$ and bus voltage $V_{BUS}$ may minimize a variation in closed-loop unity gain frequency across the entire range of duty cycles.

Figure 7:
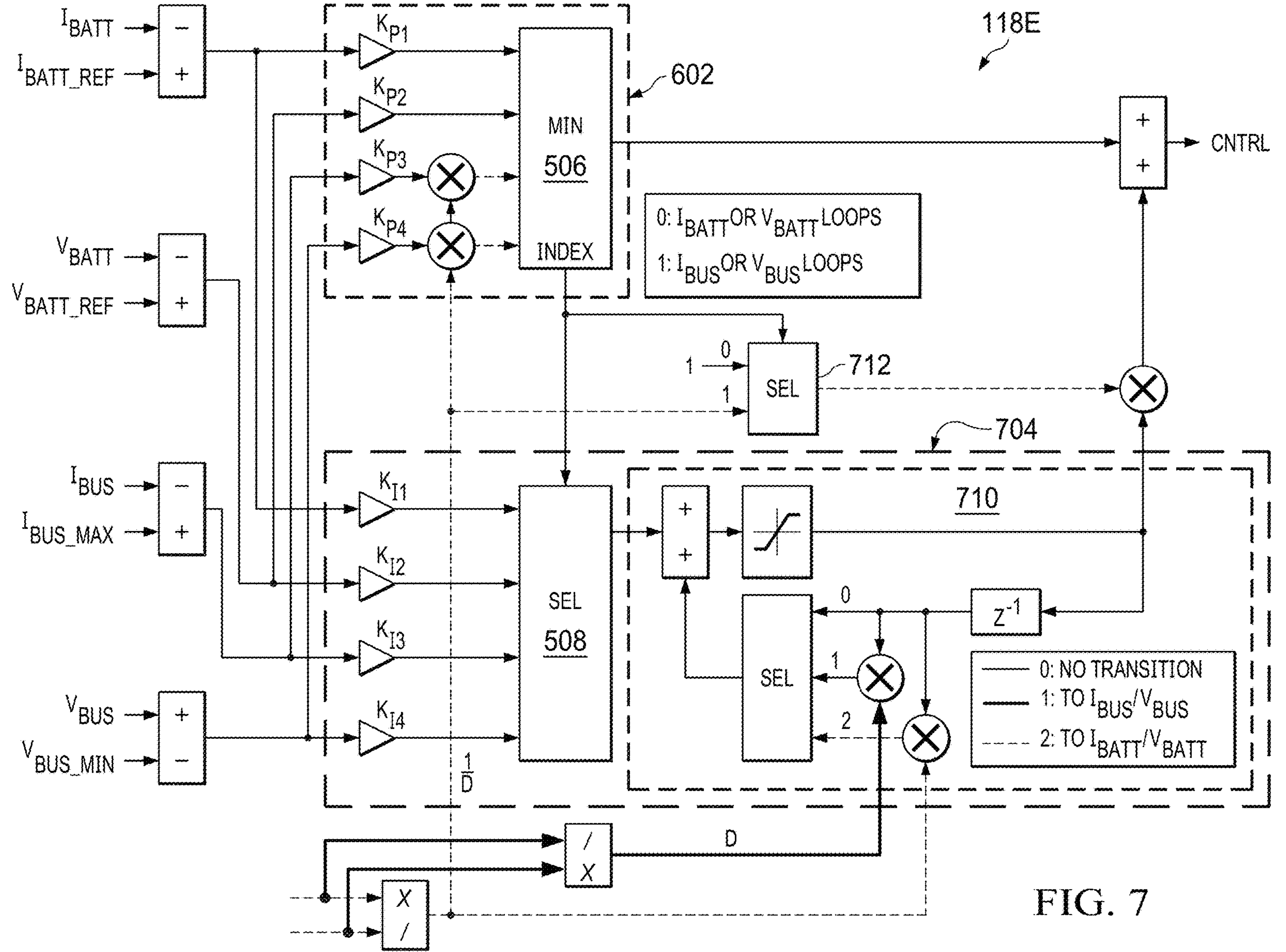
FIG. 7 illustrates an example block diagram of selected components of an outer loop controller for controlling a control parameter using a single integrator, a single minimum selector, duty cycle compensation, and unity scaling, in accordance with embodiments of the present disclosure.

FIG. 7 illustrates an example block diagram of selected components of an outer loop controller 118E for controlling control parameter CNTRL, in accordance with embodiments of the present disclosure. In some embodiments, outer loop controller 118E may be used to implement all or a portion of outer loop controller 118 shown in FIG. 1. Outer loop controller 118E of FIG. 7 may be similar in many respects to outer loop controller 118D of FIG. 6, and thus only certain differences between outer loop controller 118E and outer loop controller 118D may be described below.

In particular, outer loop controller 118E may include integral path 704 in lieu of integral path 604 of outer loop controller 118D. Integral path 704 may be similar in many respects to integral path 604, except that integral path 704 includes integrator 710 in lieu of integrator 410, and integrator 710 may be configured to perform duty-cycle scaling for the control loops of bus current $I_{BUS}$ and bus voltage $V_{BUS}$ within integrator 710 (i.e., instead of performing such scaling at the input of indexed selector 508). Further, selector 712 may be configured to, when integrator 710 performs duty cycle scaling for the control loops of bus current $I_{BUS}$ and bus voltage $V_{BUS}$, apply a gain factor 1/D to ensure a unity path gain for integrator path 704. Inclusion of duty cycle scaling within integrator 710 may improve speed of duty cycle compensation compared to outer loop controller 118D of FIG. 6.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A controller for generating a control parameter of a feedback system, the controller comprising:

a plurality of control loops, wherein each control loop of the plurality of control loops is configured to regulate a respective physical quantity and wherein each control loop of the plurality of control loops comprises:

a proportional path configured to apply a proportional gain to an error signal associated with its respective physical quantity in order to generate a proportional path output;

an integral path comprising an integrator configured to apply an integral gain to the error signal associated with its respective physical quantity and configured to cross couple control loop outputs from the other of the plurality of control loops and to select a value for accumulating an integral path output; and combiner logic configured to combine the proportional path output and the integral path output to generate a respective control loop output for the control loop; and selection logic configured to select one from the control loop outputs of the plurality of control loops as the control parameter.

2. The controller of claim 1, wherein the control parameter controls switching of a switching converter.

3. The controller of claim 1, wherein the control parameter controls switching of a switching converter of a battery charger for charging a battery.

4. The controller of claim 3, wherein the plurality of control loops comprises:

a first control loop for regulating a first current associated with the battery;

a second control loop for regulating a first voltage associated with the battery;

a third control loop for regulating a second current associated with an input network coupled between the battery charger and a source of electrical energy; and a fourth control loop for regulating a second voltage associated with an input network coupled between the battery charger and the source of electrical energy.

5. A controller for generating a control parameter of a feedback system, the controller comprising:

a proportional path comprising a first selector configured to select one of a plurality of proportional signals to generate a proportional path output, wherein each of the proportional signals is based on a respective one of a plurality of error signals, each of the plurality of error signals associated with a respective regulated physical quantity;

an integral path comprising:

a second selector configured to select one of a plurality of integral signals as a second selector output, wherein each of the integral signals is based on a respective one of the plurality of error signals; and a single integrator configured to accumulate successive samples of the second selector output to generate an integral path output; and combiner logic configured to combine the proportional path output and the integral path output to generate the control parameter.

6. The controller of claim 5, wherein:

the first selector is configured to select a minimum of the plurality of proportional signals as the proportional path output; and the second selector is configured to select a minimum of the plurality of integral signals as the second selector output.

7. The controller of claim 5, wherein:

the first selector is configured to select a minimum of the plurality of proportional signals as the proportional path output; and the second selector is configured to select an integral signal associated with the same regulated physical quantity as a proportional signal selected by the first selector as the second selector output.

8. The controller of claim 5, further comprising a compensator for a particular regulated physical quantity of the respective regulated physical quantities, compensating a respective proportional signal and a respective integral signal associated with the particular regulated physical quantity based on a duty cycle of a switching power converter controlled by the control parameter.

9. The controller of claim 5, wherein the integrator comprises compensation logic for compensating for a particular regulated physical quantity of the respective regulated physical quantities based on a duty cycle of a switching power converter controlled by the control parameter.

10. The controller of claim 5, wherein the control parameter controls switching of a switching converter.

11. The controller of claim 5, wherein the control parameter controls switching of a switching converter of a battery charger for charging a battery.

12. The controller of claim 11, wherein the plurality of regulated physical quantities comprise:

a first current associated with the battery;

a first voltage associated with the battery;

a second current associated with an input network coupled between the battery charger and a source of electrical energy; and a second voltage associated with an input network coupled between the battery charger and the source of electrical energy.

13. A method for generating a control parameter of a feedback system, the method comprising:

regulating, with each control loop of a plurality of control loops, a respective physical quantity, wherein each control loop of the plurality of control loops comprises:

a proportional path configured to apply a proportional gain to an error signal associated with its respective physical quantity in order to generate a proportional path output;

an integral path comprising an integrator configured to apply an integral gain to the error signal associated with its respective physical quantity and configured to cross couple control loop outputs from the other of the plurality of control loops and to select a value for accumulating an integral path output; and combiner logic configured to combine the proportional path output and the integral path output to generate a respective control loop output for the control loop; and selecting one from the control loop outputs of the plurality of control loops as the control parameter.

14. The method of claim 13, wherein the control parameter controls switching of a switching converter.

15. The method of claim 13, wherein the control parameter controls switching of a switching converter of a battery charger for charging a battery.

16. The method of claim 15, wherein the plurality of control loops comprises:

a first control loop for regulating a first current associated with the battery;

a second control loop for regulating a first voltage associated with the battery;

a third control loop for regulating a second current associated with an input network coupled between the battery charger and a source of electrical energy; and a fourth control loop for regulating a second voltage associated with an input network coupled between the battery charger and the source of electrical energy.

17. A method for generating a control parameter of a feedback system, the method comprising:

selecting, with a first selector of a proportional path of the feedback system, one of a plurality of proportional signals to generate a proportional path output, wherein each of the proportional signals is based on a respective one of a plurality of error signals, each of the plurality of error signals associated with a respective regulated physical quantity;

selecting, with a second selector of an integral path of the feedback system, one of a plurality of integral signals as a second selector output, wherein each of the integral signals is based on a respective one of the plurality of error signals;

accumulating, with a single integrator of the integral path, successive samples of the second selector output to generate an integral path output; and combining the proportional path output and the integral path output to generate the control parameter.

18. The method of claim 17, further comprising:

selecting a minimum of the plurality of proportional signals as the proportional path output; and selecting a minimum of the plurality of integral signals as the second selector output.

19. The method of claim 17, further comprising:

selecting a minimum of the plurality of proportional signals as the proportional path output; and selecting an integral signal associated with the same regulated physical quantity as a proportional signal selected by the first selector as the second selector output.

20. The method of claim 17, further comprising for a particular regulated physical quantity of the respective regulated physical quantities, compensating a respective proportional signal and a respective integral signal associated with the particular regulated physical quantity based on a duty cycle of a switching power converter controlled by the control parameter.

21. The method of claim 17, further comprising compensating for a particular regulated physical quantity of the respective regulated physical quantities based on a duty cycle of a switching power converter controlled by the control parameter.

22. The method of claim 17, wherein the control parameter controls switching of a switching converter.

23. The method of claim 17, wherein the control parameter controls switching of a switching converter of a battery charger for charging a battery.

24. The method of claim 23, wherein the plurality of regulated physical quantities comprise:

a first current associated with the battery;

a first voltage associated with the battery;

a second current associated with an input network coupled between the battery charger and a source of electrical energy; and a second voltage associated with an input network coupled between the battery charger and the source of electrical energy.

* * * * *